C. C. KEESLER.
TRAILER SUPPORTING MEANS.
APPLICATION FILED DEC. 22, 1916.

1,394,737.

Patented Oct. 25, 1921.
3 SHEETS—SHEET 1.

INVENTOR
Clyde C. Keesler
BY
Parsons & Bodell
ATTORNEYS

C. C. KEESLER.
TRAILER SUPPORTING MEANS.
APPLICATION FILED DEC. 22, 1916.

1,394,737.

Patented Oct. 25, 1921.
3 SHEETS—SHEET 2.

INVENTOR
Clyde C. Keesler
BY
Parsons & Bordell
ATTORNEYS

C. C. KEESLER.
TRAILER SUPPORTING MEANS.
APPLICATION FILED DEC. 22, 1916.

1,394,737.

Patented Oct. 25, 1921.

INVENTOR
Clyde C. Keesler
BY
Parsons + Bodell
ATTORNEYS

UNITED STATES PATENT OFFICE.

CLYDE C. KEESLER, OF CANASTOTA, NEW YORK, ASSIGNOR TO WATSON WAGON COMPANY, OF CANASTOTA, NEW YORK, A CORPORATION OF NEW YORK.

TRAILER-SUPPORTING MEANS.

1,394,737.   Specification of Letters Patent.   Patented Oct. 25, 1921.

Application filed December 22, 1916. Serial No. 138,352.

*To all whom it may concern:*

Be it known that I, CLYDE C. KEESLER, a citizen of the United States, and a resident of Canastota, in the county of Madison and State of New York, have invented a certain new and useful Trailer-Supporting Means, of which the following is a specification.

This invention has for its object a particularly simple and efficient means for supporting wagon bodies when one pair of wheels are removed, which means is particularly applicable to support the front end of a trailer when the tractor, which normally supports the front end of the trailer, is disconnected therefrom; and the invention consists in the combinations and constructions hereinafter set forth and claimed.

In describing this invention, references is had to the accompanying drawings in which like characters designate corresponding parts in all the views.

Figure 1:
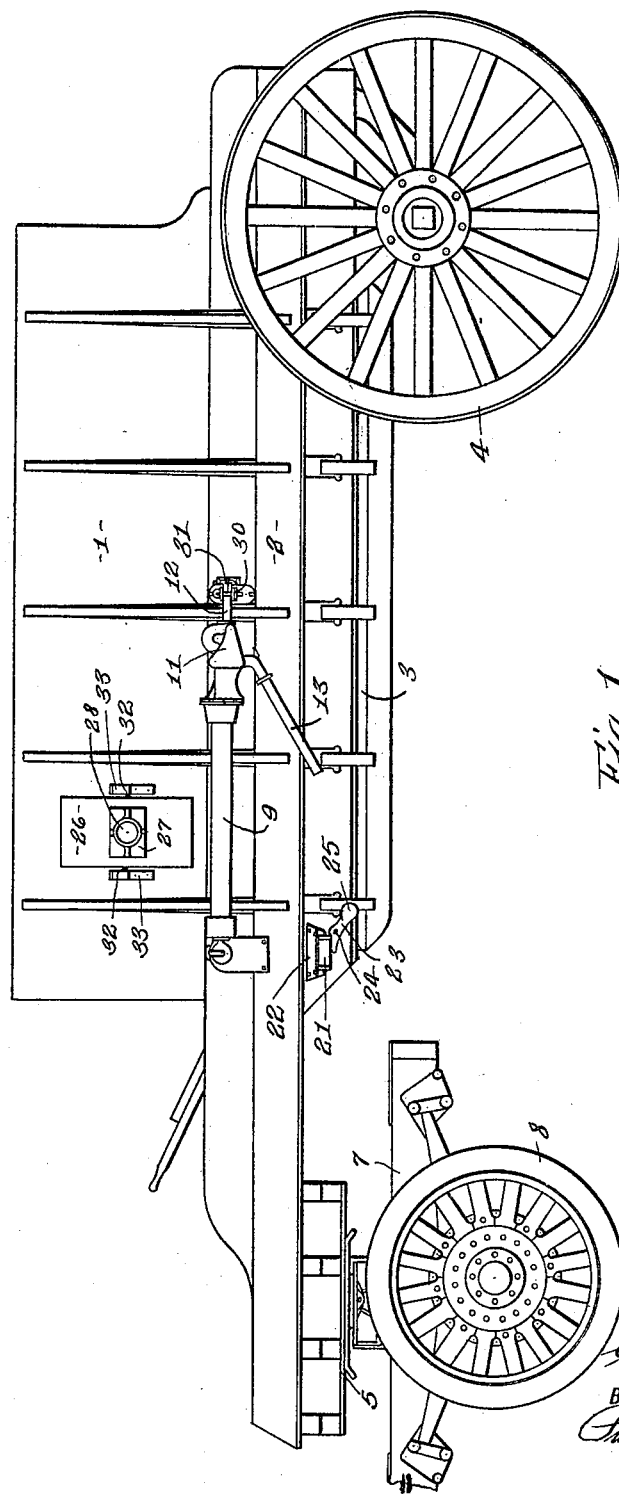
Figure 1 is a side elevation of a dump wagon embodying my invention, the rear end of the tractor being shown as supporting the front end of the wagon, and the body supporting means being shown as in its inoperative position.

This invention comprises generally, a wagon, a leg for supporting the front portion of the wagon, when the tractor is removed, the leg being connected to the wagon body by a universal joint, and means for holding the leg from movement at its universal joint and substantially rigid with the wagon body when the leg is in upright or operative position.

1 designates the body of the wagon which may be of any suitable form, and construction, it being here shown as including a frame 2 supporting a hopper or box having dumping bottoms 3.

4 designates the rear wheels; 5 a section of the fifth wheel and 6, the king bolt, the fifth wheel section 5 and bolt 6 being adapted to coöperate with complemental parts provided on the rear end of the frame 7 of the tractor, this tractor being constructed to be coupled to any one of a number of trailers.

8 designates one of the rear or drive wheels of the tractor.

In this embodiment of my invention, I have shown two supporting legs one on each side of the wagon body, these legs being alike in construction and a description of one will suffice for both.

Figure 2:
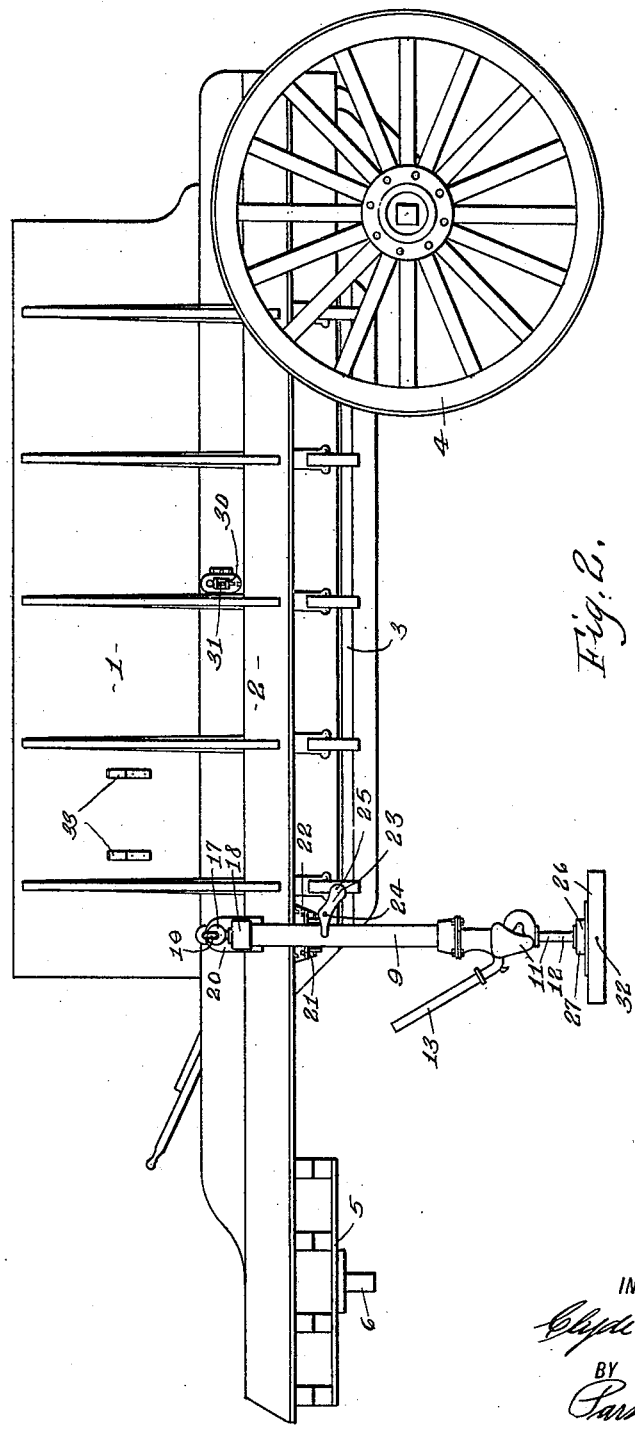
Fig. 2 is a side elevation of the wagon body when the tractor is detached therefrom and the supporting means is in its operative or upright position.
Figure 3:
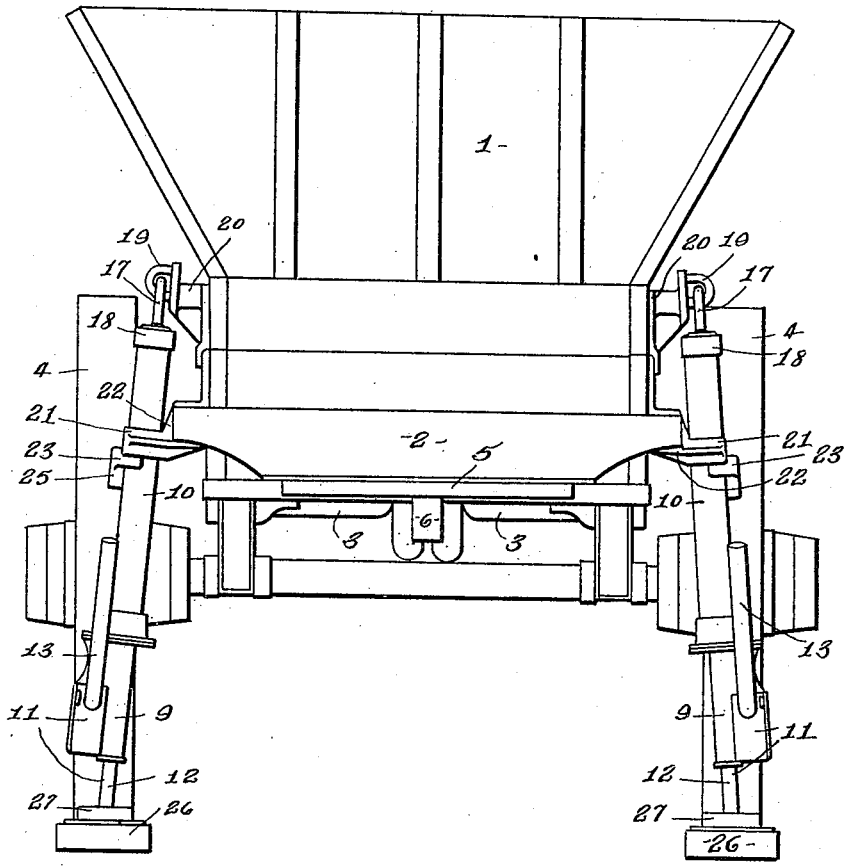
Fig. 3 is a front elevation of the parts seen in Fig. 2.
Figure 4:
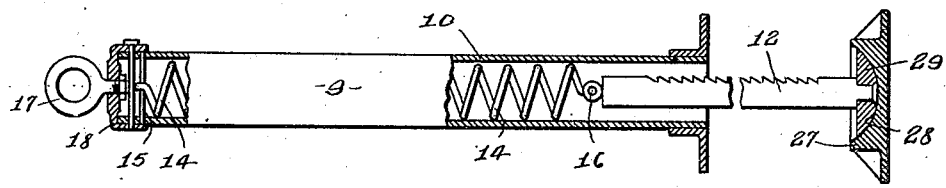
Fig. 4 is a detail view of the lifting jack.

9 designates the leg which is pivotally connected to the wagon frame, it being here shown as connected thereto by a universal joint which permits it to be swung forwardly and rearwardly and outwardly and inwardly. The leg 9 is normally arranged in a horizontal position as shown in Fig. 1, and is movable from its horizontal position to an upright position as shown in Figs. 2 and 3. The leg is held substantially rigid with the body when in its upright position as will be hereinafter described.

In this embodiment of my invention, each leg includes a tubular part 10 and a lifting jack 11 including a toothed bar 12 and suitable mechanism coacting with the bar and operated by a handle 13 for lifting the tubular part 10 relatively to the member or bar 12.

The lifting jack 11 may be of any suitable form, size and construction, and as the construction of the same is well known, it is thought that further description is unnecessary.

The rack bar 12 is held from detachment form the tubular part 10 and is movable in the tubular part 10 by means of a spring 14 connected at its upper end to a pin 15 extending transversely through the tubular part 10 and at its lower end at 16 to the upper end of the rack bar 12.

In this embodiment of my invention an eye 17 is shown swiveled in a cap 18 at the upper end of the tubular part 10 of the leg, and linked in an eye 19 rigid with a bracket 20 fixed to the wagon frame. The swivel permits the tubular part 10 to be turned so that the handle 13 of the jack can be arranged in any convenient position.

The means for holding each leg 9 from movement at its universal joint when the leg is in its upright position, comprises means for coacting with a leg 9 to hold the same from fore and aft movement, and a member for holding the leg also from lateral movement out of engagement with the former means. The means for holding the leg from fore and aft movement as here shown includes a fork 21 provided on the bracket 22 secured to the wagon frame 2 and having its open end facing laterally in the position to receive the tubular part 10 of the leg; and the member for holding the leg in a fork includes a closure or lock 23 pivoted at 24 between its ends to said bracket 22 and having one arm thereof movable into position across the open end of the fork to engage a lateral face of the leg 9, and having its other arm 25 weighted so as to move the closure into its closed position.

My wagon supporting means also includes a detachable foot piece 26 having a socket 27 for receiving the bar 12, the socket being shown as having a concave bottom 28 in order to permit the bar 12 to readily tilt therein, and avoid breaking of said bar and permit the bar to find its bearing in the socket. Each bar 12 is here shown as having a bearing 29 at its lower end which has a spherical convex face complemental to the socket 27.

The leg 9 is held in its horizontal position by a suitable horizontal fork 30 fixed to the side frame of the wagon in position to receive a portion of the leg 9 as the bar 12, this bar being locked in the fork 30 in any suitable manner as by a pin 31. The foot piece 26 and the wagon body are also provided with means for interlocking whereby the foot piece is readily carried by the body, this interlocking means including pins or shoulders 32 on opposite sides of the foot piece which engage suitable hook-shaped straps 33 on the upper part of the wagon body.

In operation, before the tractor is detached from the wagon, the foot pieces 26 are detached from the wagon body and placed on the ground, the legs 9 swung outwardly and downwardly from their horizontal positions, and the lower ends of the bars 12 stepped in the sockets 27 of the foot pieces, and the closures 23 swung by their weights 24 to their operative position after being first swung from in front of the forks 21, to permit the legs to enter the forks. The lifting jacks are adjusted to the proper position so that the wagon will stand substantially level when the tractor is removed. The fork 21 and the closures or locks 23 hold the legs rigid with the body and prevent fore and aft movement and outward movement of the body relatively to the legs in case the wagon should shift its position for any reason, and the concave bottoms of the foot sockets 27 permit the bar 12 to readily shift therein in case of a change of position of the legs relatively to the feet 26.

When the wagon is again connected to the tractor the jacks are operated to shorten the legs so that the foot pieces 26 can be removed and replaced on the wagon body.

The closures 23 are operated to permit the legs 9 to be swung outwardly and upwardly until the bars 12 can be engaged with the forks 30.

What I claim is:

1. The combination with a semi-trailer having a fifth wheel section at its front end for engagement with the tractor, of a leg for supporting the front end of the body of the semi-trailer and a socket on the body of the semi-trailer alined with said joint for receiving a portion of the leg when in its upright position, substantially as and for the purpose specified.

2. The combination with a semi-trailer having a fifth wheel section at its front end for engagement with the tractor, of a leg for supporting the front end of the body of the semi-trailer, a fork shaped socket on the body of the semi-trailer vertically alined with said joint for receiving a portion of the leg when in its upright position, and means for closing the open side of the socket, substantially as and for the purpose set forth.

3. The combination wth a semi-trailer having a fifth wheel at its front end for engagement with the tractor, of a leg for supporting the front end of the semi-trailer, the leg being connected to the body of the semi-trailer by a universal joint, a foot for the leg, a universal joint between the leg and the foot, and means for holding the leg from movement relatively to the body of the semi-trailer when the leg is in its upright position, substantially as and for the purpose specified.

In testimony whereof, I have hereunto signed my name, at Syracuse, in the county of Onondaga, and State of New York, this 14th day of November, 1916.

CLYDE C. KEESLER.